United States Patent [19]

Schuster

[11] 4,105,896

[45] Aug. 8, 1978

[54] ROTARY DEVICE FOR PRODUCING AND/OR PROCESSING WEBS, PIECES, FOILS AND COMPOSITE MATERIALS

[75] Inventor: Wolfgang Schuster, Kalletal, Germany

[73] Assignee: Herbert Kannegiesser Kommanditgesellschaft, Vlotho, Germany

[21] Appl. No.: 637,431

[22] Filed: Dec. 3, 1975

[30] Foreign Application Priority Data

Oct. 1, 1975 [DE] Fed. Rep. of Germany ....... 2543806

[51] Int. Cl.² .................... B21B 27/10; D06C 15/08; H05B 3/00
[52] U.S. Cl. .................................. 219/470; 122/366; 165/89; 165/105; 219/471; 219/530
[58] Field of Search ............... 219/469, 470, 471, 530, 219/380, 326, 10.49, 10.61; 165/105, 86, 89; 57/34 HS; 28/62; 122/366

[56] References Cited

U.S. PATENT DOCUMENTS

| 502,729 | 8/1893 | Kreusler | 122/366 |
| 3,471,683 | 10/1969 | Bogue | 219/469 |
| 3,562,489 | 2/1971 | Lenk | 165/89 |
| 3,621,908 | 11/1971 | Pravda | 165/86 |
| 3,677,329 | 7/1972 | Kirkpatrick | 219/326 |
| 3,769,551 | 10/1973 | Corman et al. | 165/105 |
| 3,842,596 | 10/1974 | Gray | 165/105 |
| 3,855,449 | 12/1974 | Scheider | 165/105 |

FOREIGN PATENT DOCUMENTS

| 51,020 | 11/1966 | German Democratic Rep. | 219/469 |
| 833,416 | 3/1952 | Fed. Rep. of Germany | 219/469 |
| 2,433,141 | 1/1976 | Fed. Rep. of Germany | 219/469 |
| 45-2,709 | 1/1970 | Japan | 219/469 |
| 427,654 | 7/1967 | Switzerland | 219/469 |

Primary Examiner—Bruce A. Reynolds
Assistant Examiner—Bernard Roskoski
Attorney, Agent, or Firm—Sughrue, Rothwell, Mion, Zinn and Macpeak

[57] ABSTRACT

Radial projections are formed at opposed ends of a double walled hollow cylinder which form a vapor condensation chamber such that the radially outer wall is heated by means of vapors condensing thereon. Heating elements are mounted at the annular compartments and a steel wool packing is carried within each compartment and extends in a continuous annular manner throughout each compartment to distribute vaporizable liquid by the steel wool packing for effective vaporization as a result of energization of the heating elements.

7 Claims, 2 Drawing Figures

ROTARY DEVICE FOR PRODUCING AND/OR PROCESSING WEBS, PIECES, FOILS AND COMPOSITE MATERIALS

BACKGROUND OF THE INVENTION

1. Field of the Invention

The present invention relates to a rotary device for producing and/or processing webs, pieces, foils and composite materials, more particularly, for processing textile webs and pieces in the field of manufacturing ready-to-wear articles of clothing and for producing and processing foils and composite materials in the field of processing synthetic materials, wherein the part of the rotary device which comes into contact with the webs, pieces, foils and composite materials to be produced and/or processed, for example, the outer wall of a hollow cylinder, is heated by means of vapors condensing thereon. These vapors are produced by evaporation of a fluid disposed within the rotary device.

2. Description of the Prior Art

In the case of a known rotary device of the above type (German Utility Model No. 1,947,145), which may be both in the form of a single-walled and a double-walled hollow cylinder closed at the ends by means of base plates, to produce vaporization, the liquid disposed in the hollow cylinder is heated by means of so-called rod-shaped heating elements which may possibly be disposed in protective tubes. When the rotary device rotates, the rod-shaped heating elements come into direct contact with at least the liquid which is disposed in the lowest part of the cylinder and which covers essentially the entire length of the hollow cylinder. For this purpose, the rod-shaped heating elements are inserted through the aforementioned base plates. The amount of water which is introduced into the hollow cylinder is preferably such as to completely cover the lowest heating element. Various liquids can be employed. The most suitable liquids are water, thermally stable oil and liquid mixtures such as the eutectic mixture of diphenyl and diphenylene oxide which is sold under the trade name of Diphyl.

In the case of another rotary device of the type mentioned initially (German Pat. No. 833,416), which is in the form of a single-walled hollow cylinder, vaporization of the liquid mainly takes place in a chamber in the form of an annular compartment which is disposed laterally on the hollow cylinder but which is rigidly connected to the bored journal pin or base thereof. The outer diameter of the annular compartment is smaller than the outer diameter of the hollow cylinder. The heat required for vaporization of the liquid is produced by means of a radiation heating element which is mounted in a stationary manner on the outer wall of the annular compartment and thus does not rotate with the same. The level of the liquid in the annular compartment and the hollow cylinder of the rotary device is regulated in such a way that it is both possible for the vapor to pass from the annular compartment — also designated as the vapor generator — to the hollow chamber of the hollow cylinder and for the condensate produced in the hollow cylinder to return via the bore in the journal pin or base thereof.

A rotary device comprising annular compartments is also known (U.S. Pat. No. 3,621,908), wherein the outer diameter of the annular compartments is larger than the outer diameter of the hollow cylinder. The enlarged annular compartments are used as liquid, resp., condensation collecting chambers.

The above-mentioned known rotary devices have various disadvantages-particularly if their dimensions are large. These disadvantages concern the usable work surface, reliability of operation, maintenance, temperature distribution on the work surface, temperature regulation and production and maintenance costs. To the extent that these disadvantages are due to the liquids to be vaporized, they occur because the liquids are subject, inter alia, to a low thermal stability, a low heat transfer density and high vapor pressures and because they are combustible and toxic.

In the case of rotary devices having incorporated therein heating elements which rotate with the rotary device it is also known to provide a slip ring/brush combination for supplying electrical energy to these heating elements (German Utility Model No. 1,947,145, German Pat. No. 1,226,287, East German Pat. No. 51,020). It is also known to provide heat sensors, a manometer and an electrical temperature regulating device.

SUMMARY OF THE INVENTION

The object of the present invention is to provide a rotary device of the type described initially which obviates the disadvantages of the known devices.

The rotary device according to the invention is characterized by the combination of the following features:

annular compartments are provided to receive the liquid to be vaporized; these annular compartments are preferably such that their outer diameter is larger than the outer diameter of the part of the rotary device which comes into contact with the webs, pieces, foils and composite materials to be produced and/or processed, although they may be of smaller diameter than the outer diameter of the rotary device.

heating elements, preferably sleeve-type elements are provided on the outer side of the wall of the annular compartments, and a steel wool packing or the like which operates as a sponge is disposed inside the annular compartments.

By virtue of this combination of partially known features it is possible, in particular, to produce rotary devices having large dimensions which achieve optimum values in terms of the usable work surface, reliability of operation, maintenance, temperature distribution on the work surface, temperature control and production and maintenance costs. Thus, for example, in the case of a rotary device which comprises as its work surface, the outer side of the wall of a hollow cylinder, it is possible for the entire outer side in each direction to be used as the work surface and also for this work surface to be maintained at a specific temperature — even in the case of localized variations in the heat which is emitted.

By providing a steel wool packing which acts as a sponge inside the annular compartments, the vaporization surface for the liquid introduced into the annular compartments is considerably enlarged. In addition, increased quantities of this liquid share the rotational movement of the rotary device. This is advantageous for the vaporization process and thus for temperature distribution on the work surface of the rotary device. Another consequence is that it is only necessary to provide relatively small annular compartments — even in the case of rotary devices having large dimensions.

Further advantageous features of the rotary device according to the invention consist in that the heating elements are either disposed on the outer side of the wall of the annular compartments and are preferably in the form of sleeve-type elements or they are disposed inside the annular chambers in such a way that they are generally uniformly enclosed by the steel of the steel wool packing; the heating elements then consisting of known electrical rod-type heating elements which are preferably disposed in protective tubes.

The above-described disposition and configuration of the heating elements ensure reliable heating of the annular compartments filled with the steel wool packing, and thus of the liquid disposed in these compartments. This also increases the operational reliability of the rotary device and facilitates maintenance thereof.

When the above-described electric rod-type heating elements are used, it is especially advantageous if these are constantly moistened by the vaporization liquid absorbed and stored by the steel wool packings. One of the advantages of this is that the rod heating elements will not be thermally overloaded if the rotary device has a large outer diameter and rotates at a low rate such that the various rod heating elements are only dipped into the liquid sump disposed at the lower part of the annular compartments after a relatively long period of time in terms of this particular application. It is therefore unnecessary to provide a fuse for each individual heating rod for protection against thermal overloading of the same. This also applies when rod-type heating elements are disposed in protective tubes — which is an advantage in terms of maintenance, repairs and replacement of the same.

Accordingly, an especially advantageous rotary device comprises both annular compartments filled with steel wool and also heating elements in the form of heating rods which are disposed in protective tubes within the annular compartments in such a way as to be generally uniformly enclosed by the steel wool in the steel wool packings.

Other features of the rotary device according to the invention consist in that firstly, the heating elements of the device operate by means of electrical energy which is supplied to these elements in a manner known per se by means of a slip ring/brush combination and lines in which safety switches are preferably incorporated. Secondly, the heating devices and, accordingly, the temperature of the work surface is regulated by means of a temperature regulating device which is disposed in a stationary manner separate from the rotary device. The heat and/or pressure sensing elements of the temperature regulating device communicate with the chamber in which the liquid is vaporized and/or the vapor condenses and are disposed within protective tubes. Thirdly, the measurement values of the heat sensing element and/or the pressure sensing element are transmitted by means of the slip ring/brush combination and lines or by means of a contact-free data transmission means of the temperature regulating device which is mounted in a stationary manner separate from the rotary device. The desired temperature of the work surface of the rotary device can be obtained by means of the temperature regulating device.

The advantage obtained by virtue of the above features is that the heating elements of the rotary device operate in a more reliable manner and are easily regulatable.

It is also advantageous if the liquid to be vaporized which is introduced into the annular compartments is a carbon fluoride compound having ca. 6.0 ata vapor pressure at 250° C.

The advantage of using a carbon fluoride compound having a vapor pressure of 6.0 ata at 250° C, is that the rotary device involves only minimal production and servicing costs. This is due, inter alia, to the fact that this liquid is thermally very stable and has a relatively low vapor pressure at 250° C. Through the use of this liquid the rotary device is rendered operationally reliable and it can also be serviced easily and without danger owing to the fact that this liquid is non-combustible and non-toxic.

Other objects, features and advantages of the present invention will be made apparent from the following detailed description of a preferred embodiment thereof provided with reference to the accompanying drawing.

Figure 1:
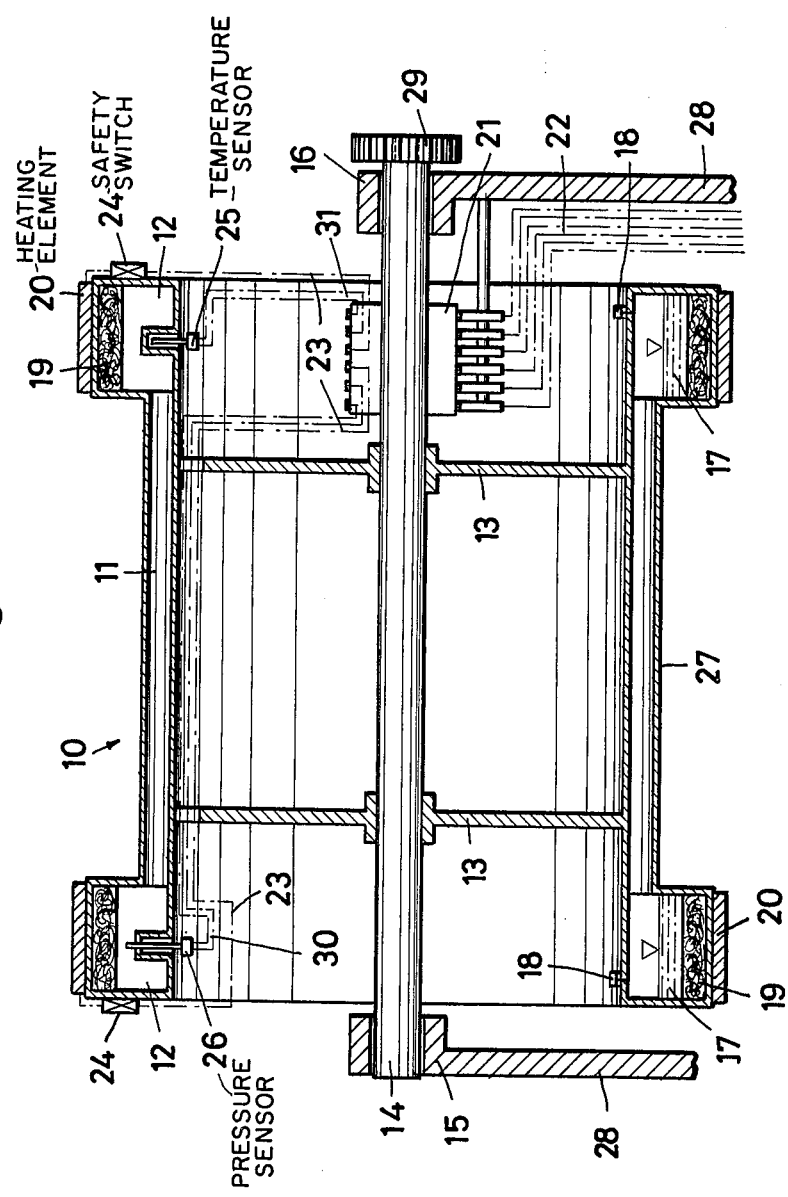
FIG. 1 is a section through a rotary device comprising annular compartments, the outer diameter of which is larger than the outer diameter of the part of the rotary device which comes into contact with the webs, pieces, foils and composite materials to be produced and/or processed and wherein sleeve-type heating devices are mounted on the outerside of the wall of the annular compartments.

10 = rotary device
11 = hollow cylinder (double-walled)
12 = annular compartment
13 = plate
14 = shaft
15, 16 = bearings
17 = liquid
18 = feed opening
19 = steel wool packing
20 = heating element (sleeve-type)
21 = slip ring/brush combination
22, 23 = lines
24 = safety switch
25 = heat sensing element
26 = pressure sensing element
27 = work surface
28 = machine frame
29 = spur wheel
30, 31 = lines
32 = heating element (rod-type heating element)
33 = Protective tube

DESCRIPTION OF THE PREFERRED EMBODIMENT

The rotary device 10 represented in the drawing consists of the double-walled hollow cylinder 11 comprising at its ends the annular compartments 12. The double-walled hollow cylinder 11 is secured on the shaft 14 by means of the plate 13 comprising welded hubs. The shaft 14 is, in turn, mounted in the bearings 15, 16 of a machine frame 28 (only partially shown).

The rotary device 10 is driven by means of known drive elements. Of these drive elements only the spur wheel 29 mounted on the shaft 14 is represented in the drawing.

The annular compartments 12 disposed at the ends of the double-walled hollow cylinder 11 are filled with the liquid 17 up to the line indicated by the triangle. The liquid is fed into the annular compartments 12 through the feed openings 18 which can be closed in a gas-tight manner. However, these feed openings 18 are only closed when the chamber, resp., the annular compartments 12 into which the liquid 17 has been admitted and in which it is vaporized and also the chamber in the double-walled hollow cylinder 11 in which the vapor condenses, have been evacuated.

A steel wool packing 19, which operates as a sponge is disposed on the inner side of the outer wall of the annular compartments 12.

Each of the annular compartments 12 also comprises a sleeve-type heating element 20, which is attached to the outer side of the outer wall of the compartments by means of a clamping device (not shown). Electrical energy is supplied to the heating elements 20 through part of the lines 22, the slip ring/brush combination 21 and lines 23 in which safety switches 24 are incorporated. When the permissible temperature of the rotary device 10 is exceeded, the safety switches 24 shut off the electrical energy, resp., the heating current.

The slip ring/brush combination 21 is also used for transmission of the measurement values from the heat sensing element 25, which is disposed in a protective tube and also from the pressure sensing element 26, which is also disposed in a protective tube to the temperature regulating device (not shown), which is mounted in a stationary manner apart from the rotary device (10). For this purpose, the heat sensing element 25 and the pressure sensing element 26 are connected by means of lines 30, 31 to the slip ring/brush combination 21, which, in turn, is connected to the temperature regulating device disposed in a stationary manner apart from the rotary device by means of a portion of the lines 22.

A contact-free data transmission device which is known per se, can also be used for transmitting the measurement values in place of the lines 22, 30, 31 and the slip ring/brush combination 21.

The rotary device 10 also comprises all the other known elements which are required for the efficient operation of the device. These are not represented in the drawings.

Figure 2:
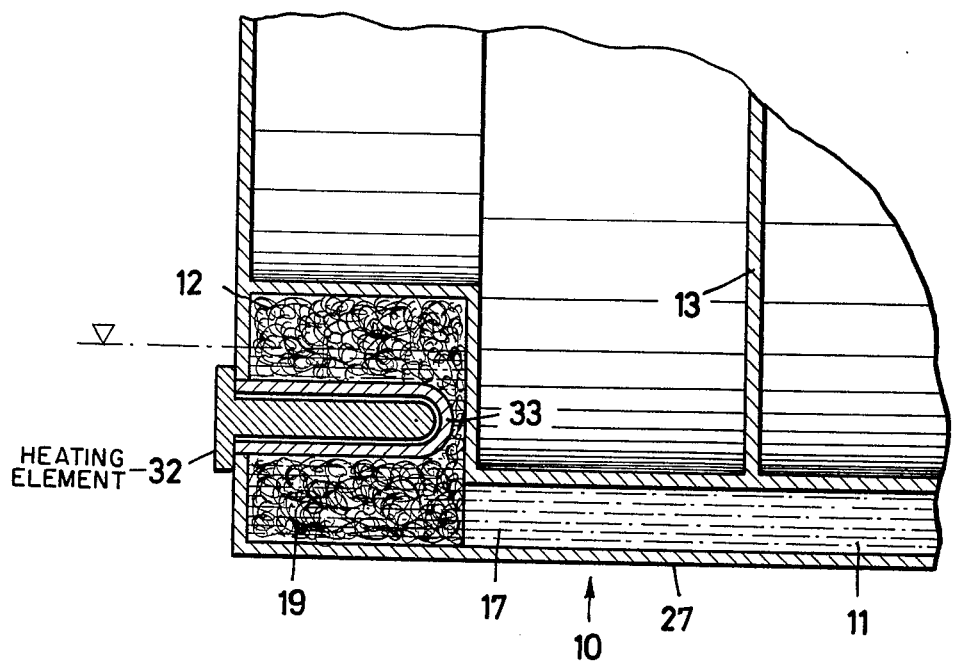
FIG. 2 is an enlarged view of a part of the rotary device as shown in FIG. 1, but wherein the outer diameter of the annular compartment corresponds to that of the part of the rotary device which comes into contact with the webs, pieces, foils and composite materials to be produced and/or processed and wherein the heating elements are disposed within the annular compartment. The reference numbers in the drawing designate the following.

FIG. 2 is a partial enlarged view of the embodiment of a rotary device according to FIG. 1, wherein the outer diameter of the annular compartment 12 is not larger than but equal to the outer diameter of the part of the rotary device 10, which comes into contact with the webs, pieces, foils and composite materials to be produced, i.e., the work surface 27. In this case, the annular compartments 12 have heating devices 32 in the form of electric rod-type heating elements which are disposed in protective tubes 33 and mounted in the annular compartments 12 in such a way that they are embedded in the steel wool packing 19, or enclosed by steel wool in a generally uniform manner. In this case, the liquid to be vaporized is filled up to the line marked by the triangle in the annular compartments 12 and the part of the double-walled hollow cylinder 11, which communicates freely with the latter.

The heating system operates in the following manner:

When electrical energy or heating current is supplied through the slip ring/brush combination 21, to the heating elements 20 or 32 of the annular compartments 12 of the rotating, horizontally mounted rotary device 10, the annular compartments 12, the steel wool packings 19 contained therein and, accordingly the liquid 17, to be vaporized, are heated.

This liquid is heated particularly easily as it is more or less regularly distributed in the steel wool packings during rotation of the rotary device. When the liquid 17 reaches its vaporization temperature, the chamber of the annular compartments 12, which does not contain liquid 17 and also the chamber of the double-walled hollow cylinder 11, which is in communication with the first chamber are filled with vapor by reason of the above-mentioned evacuation. The vapor then condenses on the still cold walls of the double-walled hollow cylinder 11, while emitting a corresponding amount of heat. The condensate which is formed, flows into the annular compartments 12 and the cycle begins once again. The outer wall of the double-walled hollow cylinder 11 and, accordingly, the work surface 27 of the rotary device 10 is only heated by the condensing vapors.

The rotary device according to the invention is especially suitable for use in the manufacture of ready-made articles of clothing for bonding textile webs and pieces, for example, for over garments, and also for printing textile webs and pieces, more particularly, meshed goods containing synthetic fibers, by the transfer process wherein a support material, for example, a paper web coated with dyestuffs sublimable at temperatures of ca. 180°–220° C, is brought into contact with the web to be printed.

In the field of processing synthetic materials the rotary device according to the invention is especially suitable for use in producing composite materials which are produced by laminating a web of foamed plastic with one or more webs consisting of paper or the like and possibly effecting a further refoaming operation. However, in this case, it is also possible to use prefoamed plastic granulate in place of a foamed web and to refoam and laminate this in one operating step.

In the above-described examples, the material to be processed is brought into contact with the outer side of the outer wall of the hollow cylinder 11, or the work surface 27, of the rotary device 10 and it co-rotates partially with the latter. The devices required for supplying and removing the materials have not been represented in the drawings as they are known per se.

What is claimed is:

1. A rotary device for producing and/or processing webs, pieces, foils and composite materials, more particularly, for processing textile webs and pieces in the field of manufacturing ready-to-wear clothing and for producing and processing foils and composite materials in the field of processing synthetic materials, said rotary device comprising a double-walled hollow cylinder including radially inner and outer spaced walls, end plates at the ends of said walls and defining a vapor condensation chamber such that the radially outer wall is heated by means of vapors condensing thereon, said condensation chamber carrying a liquid for vaporization and condensation, the improvement comprising:

one of said walls including radial projections at opposed ends and defining with said end plates annular compartments of increased radial size relative the portion of said chamber interposed between said annular compartments, heating elements mounted to said double walled hollow cylinder at said annular compartments, and a steel wool packing carried within each annular compartment and extending in a continuous, annular manner throughout each compartment such that said vaporizable liquid is distributed by said steel wool packing throughout said compartment for effective vaporization by energization of said heating elements.

2. A rotary device as claimed in claim 1, wherein the heating devices are disposed on the outer side of the wall of the annular compartments, and are preferably in the form of a sleeve.

3. A rotary device as claimed in claim 1, wherein said heating elements project internally of the annular compartment and are generally uniformly enclosed by the steel wool packing.

4. A rotary device as claimed in claim 3, wherein said heating elements consist of rod-type heating elements disposed in protective tubes which separate the heating elements from the steel wool packing.

5. A rotary device as claimed in claim 1, further comprising a slip ring/brush assembly mounted to said rotary device for rotation therewith, and lines leading from said slip rings to said electrical heating elements and including safety switches therein for disconnection of the heating elements from the slip rings.

6. A rotary device as claimed in claim 5, further comprising a heat sensing element and a pressure sensing element mounted to said hollow cylinder for sensing the temperature and pressure of the vapor within the condensation chamber and means for electrically connecting said heat sensing element and said pressure sensing element to said slip ring/brush assembly.

7. A rotary device as claimed in claim 1 wherein the outer diameter of the annular compartments is larger than the outer diameter of the part of the rotary device which comes into contact with the webs, pieces, foils and composite materials to be produced and/or processed.

* * * * *